United States Patent [19]
Oetiker

[11] Patent Number: 5,544,392
[45] Date of Patent: Aug. 13, 1996

[54] CLAMP STRUCTURE WITH SPRING ELEMENT

[75] Inventor: Hans Oetiker, Horgen, Switzerland

[73] Assignee: Hans Oetiker AG Maschinen -und Apparatefabrik, Switzerland

[21] Appl. No.: 396,256

[22] Filed: Mar. 1, 1995

[51] Int. Cl.$^6$ ..................................................... F16L 33/02
[52] U.S. Cl. ........................................ 24/20 CW; 24/20 S
[58] Field of Search ............................... 24/20 R, 20 CW, 24/20 S, 20 W, 23 R

[56] References Cited

U.S. PATENT DOCUMENTS

| 4,742,600 | 5/1988 | Calmettes et al. | 24/20 R |
| 5,090,066 | 2/1992 | Schoepe et al. | 24/23 R X |
| 5,111,555 | 5/1992 | Oetiker | 24/20 R |
| 5,138,747 | 8/1992 | Oetiker | 24/20 R |

Primary Examiner—James R. Brittain
Attorney, Agent, or Firm—Paul M. Craig, Jr.

[57] ABSTRACT

An open clamp structure in which overlapping band portions are mechanically connected by a spring separate from the clamping band; the spring is thereby of low profile having a top portion and lateral portions passing over into mutually facing end portions which are provided with tongue-like extensions adapted to engage in tunnel-shaped embossments in corresponding parts of the clamping band. Means for limiting the extent of stretching to which the spring can be subjected and also providing at the same time a guide function to keep overlapping band portions mutually aligned includes either two tab-like members extending in the longitudinal direction within two narrow slot-like openings only slightly wider than the thickness of the clamping band and of predetermined length or a tunnel-shaped embossment in the inner band portion extending in an elongated opening of only slightly larger width than the embossment to provide the guide function.

9 Claims, 1 Drawing Sheet

5,544,392

CLAMP STRUCTURE WITH SPRING ELEMENT

FIELD OF THE INVENTION

The present invention relates to a clamp structure, and more particularly to a "Stepless" clamp structure with a separate spring element.

BACKGROUND OF THE INVENTION

A clamp structure with an improved spring action is described in my prior U.S. Pat. No. 5,138,747 which disclosed an auxiliary spring for interconnecting overlapping band portions. In this patent, the mutually facing end portions of the leaf spring members forming the auxiliary spring terminated in end portions bent to point in the direction toward the top portions of the leaf spring members while the connection with the inner and outer band portions took place by means of substantially S-shaped hooks adapted to engage in the apertures provided in the inner end portions. As the strength of the hooks bent out of the band portions depended at least to a large extent on the clamping band material, such as the thickness thereof, a limit exists in practice for the maximum spring force which this connection can withstand before there is danger of disengagement. Additionally, the extent of relative movement of the inner and outer band portions and therewith the extent to which the auxiliary spring can be subjected to stretching forces was limited by a hook extending outwardly and adapted to engage in an oversized aperture. Though the limiting action proved reasonably successful, the outwardly extending hook was not able to provide a completely satisfactory guide function to keep the inner and outer band portions in proper mutual overlapping alignment.

SUMMARY OF THE INVENTION

It is a principal object of the present invention to provide a clamp structure with improved spring action which eliminates by simple means the aforementioned shortcomings and drawbacks encountered with the prior art clamp structures.

Another object of the present invention resides in a clamp structure of the type mentioned above which can be easily assembled and adapted to the requirements of the spring action of a given application while at the same time assuring proper mutual guidance of the overlapping band portions coupled with limiting the extent to which the spring structure can be subjected to stretching forces.

The underlying problems are solved according to the present invention in that the auxiliary spring is a low profile spring with a convexly shaped top portion having a large radius of curvature passing over into convexly shaped lateral portions having a much smaller radius of curvature than the top portion and terminating in mutually facing tongue-like extensions which are adapted to engage in tunnel-shaped embossments pressed out of the corresponding band portions by deep-drawing after two transversely extending cuts in each band portion. The location of these tunnel-shaped embossments is thereby in the end area of the outer band portion and in the clamping band just ahead of the beginning of the area of overlap.

According to the present invention, an improved guide and limiting action can be obtained by the use of two tab-like members bent out of the inner band portion about axes extending in the longitudinal direction of the clamping band and adapted to engage in narrow slots of predetermined length. In the alternative, the guide and limiting action can also be realized according to this invention with the use of a tunnel-shaped embossment in the inner band portion adapted to engage in an elongated opening, again of predetermined length.

BRIEF DESCRIPTION OF THE DRAWINGS

These and other objects, features and advantages of the present invention will become more apparent from the following description, when taken in connection with the accompanying drawing which shows, for purposes of illustration only, several embodiments in accordance with the present invention, and wherein:

FIG. 3 is a plan view on the spring structure of FIG. 3, taken along line 4—4;

DETAILED DESCRIPTION OF THE DRAWINGS

Figure 1:
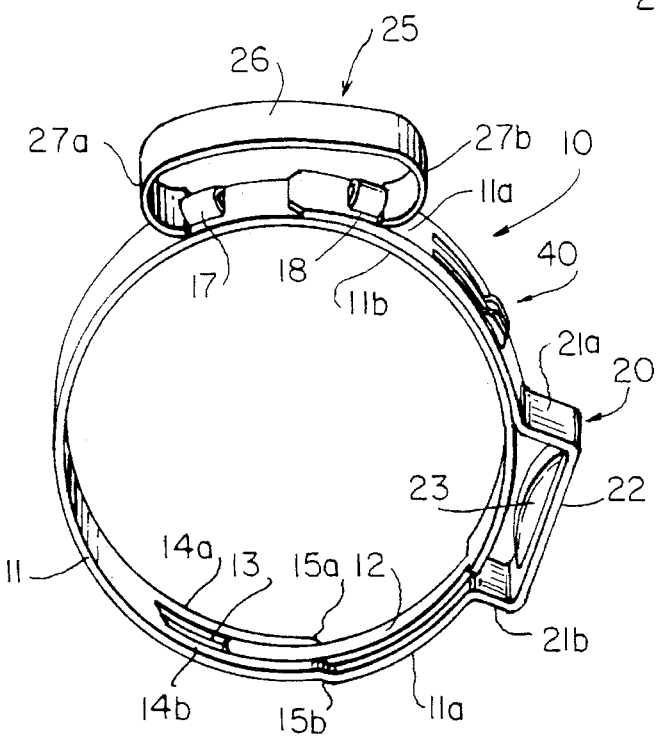
FIG. 1 is a perspective view of a clamp structure in accordance with the present invention.
Figure 2:
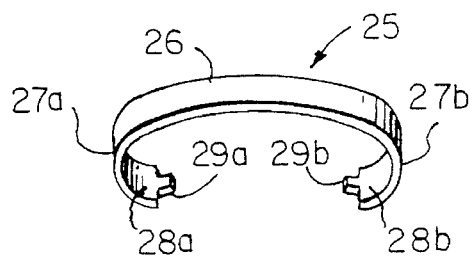
FIG. 2 is a partial cross-sectional view through the clamp structure of FIG. 1.

Referring now to the drawing wherein like reference numerals are used throughout the various views to designate like parts, and more particularly to FIGS. 1 through 5, reference numeral 10 generally designates a clamp structure with improved spring action according to the present invention which includes a clamping band 11 having overlapping inner and outer clamping band portions 11b and 11a, respectively. The clamp structure of FIGS. 1 through 5 further includes a so-called "Oetiker" ear generally designated by reference numeral 20 including generally outwardly extending leg portions 21a and 21b interconnected by a bridging portion 22 provided with reinforcing means 23 in the form of a longitudinally extending groove V-shaped in transverse cross section and of canoe-like shape in plan view or preferably of a substantially rectangular shallow depression as more fully disclosed in my prior U.S. Pat. No. 5,282,295. To provide an internal clamping surface devoid of step, offset or discontinuity within the area of the end of the inner clamping band portion, the inner clamping band portion terminates in a tongue-like extension 12 adapted to engage in a tongue-receiving means which, in the embodiment of FIG. 1, is formed by a centrally disposed pressed-out channel leaving on both sides lateral band portions 14a and 14b which pass over into the outer band portion 11a by way of step-like portions 15a and 15b as more fully disclosed in my prior U.S. Pat. No. 4,299,012. However, in lieu of a centrally disposed channel, a transition devoid of any step, offset or discontinuity in the inner clamping surface can also be achieved by an aperture beginning within the step portions 15a and 15b as more fully disclosed in my prior U.S. Pat. No. 4,315,348. It should also be noted that in the non-contracted condition of the ear-like structure 20, the gap underneath the same is already covered by the full band width of the inner band portion so that any gap remaining after contraction of the ear will be covered by the full band width of the inner band portion The auxiliary spring generally designated by reference numeral 25 is of relatively flat construction and includes a convexly shaped top portion 26 having a large radius of curvature which passes over on both sides into convexly shaped lateral band portions 27a and 27b having a radius of curvature which is much smaller than the radius of curvature of the top portion 26. The lateral portions 27a and 27b terminate in mutually facing end portions 28a and 28b, each provided with a short, centrally arranged tongue-like extension 29a and 29b. The tongue-like extensions 29a and 29b are thereby adapted to engage in tunnel-shaped embossments 17 and 18 which are obtained by pressing out and deep-drawing clamping band material after two transverse cuts for each embossment in the respective clamping band area. The tunnel-shaped embossment 17 is thereby located in the clamping band just ahead of the free end of the outer clamping band portion 11a, i.e., before the clamping band 11 passes over into the overlapped clamping band portion 11b while the tunnel-shaped embossment be is located within the end area of the outer band portion 11a. The auxiliary spring 25 and its connection with the clamping band portions thereby represents the mechanical connection for the open-type clamp structure which produces a spring action. The clamp structure of FIGS. 1 through 5 is also provided with a guide and limiting means generally designated by reference numeral 40 which consist of two transversely spaced, longitudinally extending tab-like members 41a and 41b pressed out of the inner band portion 11b about axes extending in the longitudinal direction of the clamping band (FIG. 4) after two substantially U-shaped cuts. The tab-like members 41a and 41b are thereby adapted to engage in parallelly extending narrow slots 42a and 42b of predetermined length which determine the extent to which the spring 25 can be subjected to tensional forces. Additionally, the presence of the narrow slots 42a and 42b only slightly wider than the tab-like members 41a and 41b assures a good guiding function of the overlapping band portions 11b and 11a which avoids misalignment of these overlapping band portions. The length of the slots 42a and 42b limits the extent to which the spring 25 can be subjected to forces as a result of tolerance compensation and/or temperature changes or pressure fluctuations of the medium carried by the hose.

The clamp structure according to FIGS. 1 through 5 offers significant advantages over the pre-existing clamp structures. On the one hand, it facilitates assembly of the clamp structure and, more particularly, of the spring 25 with the use of the tool engaging in the convexly shaped lateral portions 27a and 27b and spreading the same apart to be released after the tongue-like extensions 29a and 29b are aligned with the tunnel-shaped embossments 17 and 18 which then produces the mechanical connection. Similarly, the mechanical connection can be easily disconnected by merely spreading apart the lateral portions 27a and 27b of the auxiliary spring to permit disengagement of the tongue-like portions 29a and 29b from the tunnel-shaped embossments 17 and 18. Moreover, the auxiliary spring 25 of this invention also has a relatively low profile so that it can also be used with so-called earless clamp structures in which an "Oetiker" ear is omitted to avoid outwardly projecting parts. For example, the spring 25 may also be used in a low profile clamp of the type disclosed in my prior U.S. Pat. No. 4,492,004. It is only necessary to cut the clamping band and interconnect the thus open band portions in this patent with the use of the auxiliary spring connection as disclosed in this application. This will provide a spring action for the earless low profile clamp structure of my prior U.S. Pat. No. 4,492,004 and provide also tolerance compensation for this type of clamp.

Figure 6:
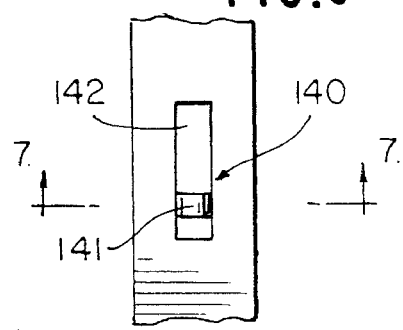
FIG. 6 is a partial plan view on a modified embodiment of a guide and limiting arrangement for use with the clamp structure of FIG. 1.
Figure 7:
FIG. 7 is a cross-sectional view, taken along line 7—7.

FIGS. 6 and 7 illustrate a modified embodiment of a guide and limiting means generally designated by reference numeral 140 which consists of a tunnel-shaped embossment pressed out by deep-drawing from the inner clamping band after two transverse cuts which is adapted to engage in an elongated opening 142 having a width only slightly larger than the width of the tunnel-shaped embossment 141 to assure proper guidance as well as limiting action.

Though it is understood that the present invention is not limited to the following indications, a typical example of a clamp structure in accordance with the present invention, given only for illustrative purposes, is as follows:

The clamping band may have a width of about 12 mm. and a thickness of about 0.8 mm. and may be made from a stainless steel X5CrNi18 10. The spring 25 also has a width of about 12 mm. and is made from a material Ck60. The remaining dimensions may be chosen as known to those skilled in the art to meet the particular requirements of a given application.

Figure 5:
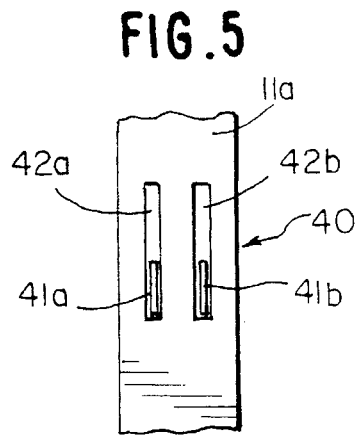
Figure 4:
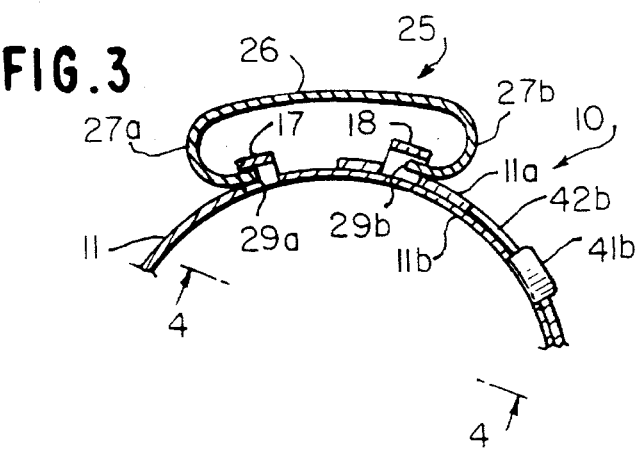
FIG. 4 is a partial top plan view on the guide and limiting arrangement of the clamp structure in FIG. 1.

The guide and limiting arrangement of FIG. 5 as also of FIG. 6 is not limited to the particular clamp structure as disclosed in the instant application but may be used to advantage wherever a guide and limiting function is desirable in connection with overlapping band portions.

While I have shown and described two embodiments in accordance with the present invention, it is understood that the same is not limited thereto but is susceptible of numerous changes and modifications as known to those skilled in the art. As mentioned before, the spring action with the use of spring and its interconnection may also be used with so-called earless low-profile clamps as also with so-called screw-type clamps as disclosed in my prior U.S. Pat. No. 4,521,940. Additionally, the spring 25 may also consist of one or several leaf springs though a solid spring member is preferable, particularly where low profile is important. Moreover by choosing the material for the spring 25, its spring characteristics can also be preselected for different applications. Thus, the present invention is susceptible of numerous changes and modifications as known to those skilled in the art, and I therefore do not wish to be limited to the details shown and described herein but intend to cover all such changes and modifications as are encompassed by the scope of the appended claims.

I claim:

1. An open clamp, comprising clamping band means having overlapping band portions, means for tightening the clamp about an object to be fastened thereby and further means operatively connecting overlapping band portions, said further means including spring means separate from the clamping band means and operable to provide a predetermined elastic tightening force in the presence of forces seeking to increase the diametric dimensions of the clamp structure, said spring means being of at least part-convexly shaped configuration including mutually facing end portions, and connecting means operatively connecting said spring means with the clamping band means including tongue-like extensions at the mutually facing end portions operable to engage in tunnel-shaped embossment means provided in the clamping band means, said tunnel-shaped embossment means being located in the end area of the outer band portion and within an area of the clamping band means just ahead of the end of the outer band portion where the clamping band means passes over into the inner band portion.

2. A clamp structure according to claim 1, wherein said tunnel-shaped embossment means are formed by deep-drawing the respective clamping band portions after two transversely extending cuts for each embossment means.

3. A clamp structure according to claim 1, further comprising additional means eliminating any gap, discontinuity or step in the internal clamping surface in such a manner that the gap of the spring means is bridged by the full band width of a part of the clamping band means itself.

4. An open clamp structure according to claim 3, wherein the additional means also includes a tongue-like extension at the inner band end and a tongue-receiving means in the outer band portion.

5. An open clamp structure according to claim 4, further comprising guide means for mutually guiding overlapping band portions and simultaneously protecting the spring means against excessive stretching.

6. An open clamp structure according to claim 5, wherein said guide means includes two tab-like members spaced from one another in the clamping band transverse direction and bent out of the inner band portion about axes extending in the clamping band longitudinal direction, said two tab-like members engaging in two parallel slots extending in the longitudinal direction and of only slightly larger width than the thickness of the clamping band means, the length of said slots determining the extent to which the spring means can be subjected to stretching.

7. An open clamp structure according to claim 5, wherein said guide means includes a tunnel-shaped embossment in the inner band portion pressed out from the inner band portion after two substantially transverse cuts by deep-drawing, said embossment being operable to engage in an opening in the outer band portion extending in the longitudinal direction thereof, said opening being only slightly larger than the embossment to provide a guide function and having a predetermined length determining the extent to which the spring means can be subjected to stretching.

8. A clamp structure according to claim 1, further comprising additional means eliminating any gap, discontinuity or step in the internal clamping surface in such a manner that the gap of the auxiliary spring structure is bridged by the full band width of a part of the clamping band means itself and including a tongue-like extension at the end of the inner band portion adapted to engage into a tongue-receiving means in the outer band portion which includes lateral band portions raised to the radial level of the outer band portion within the area of step-like portions.

9. An open clamp structure according to claim 8, wherein said tightening means includes a plastically deformable ear-like means whose gap is covered from below by the full band width of the inner band portion.

* * * * *